United States Patent
Ko et al.

(10) Patent No.: US 12,467,109 B2
(45) Date of Patent: Nov. 11, 2025

(54) GRAIN-ORIENTED ELECTRICAL STEEL SHEET AND METHOD FOR MANUFACTURING SAME

(71) Applicant: POSCO, Pohang-si (KR)

(72) Inventors: Hyun-Seok Ko, Pohang-si (KR);
Hongwook Jung, Pohang-si (KR);
Se-Min Park, Pohang-si (KR);
Jin-Wook Seo, Pohang-si (KR)

(73) Assignee: POSCO, Pohang-si (KR)

( * ) Notice: Subject to any disclaimer, the term of this patent is extended or adjusted under 35 U.S.C. 154(b) by 671 days.

(21) Appl. No.: 17/787,111

(22) PCT Filed: Dec. 17, 2020

(86) PCT No.: PCT/KR2020/018618
§ 371 (c)(1),
(2) Date: Jun. 17, 2022

(87) PCT Pub. No.: WO2021/125864
PCT Pub. Date: Jun. 24, 2021

(65) Prior Publication Data
US 2022/0389532 A1 Dec. 8, 2022

(30) Foreign Application Priority Data
Dec. 20, 2019 (KR) .................. 10-2019-0171867

(51) Int. Cl.
*C21D 9/46* (2006.01)
*C21D 6/00* (2006.01)
(Continued)

(52) U.S. Cl.
CPC .............. *C21D 9/46* (2013.01); *C21D 6/008* (2013.01); *C21D 8/005* (2013.01); *C21D 8/1222* (2013.01);
(Continued)

(58) Field of Classification Search
CPC .......... C21D 9/46; C21D 6/008; C21D 8/005; C21D 8/1222; C21D 8/1233;
(Continued)

(56) References Cited

U.S. PATENT DOCUMENTS

2015/0318092 A1 11/2015 Shingaki et al.
2016/0108493 A1 4/2016 Schuster et al.
(Continued)

FOREIGN PATENT DOCUMENTS

CN 1401793 A 3/2003
CN 107002161 A 8/2017
(Continued)

OTHER PUBLICATIONS

Chinese Search Report dated Apr. 25, 2023 issued in Chinese Patent Application No. 202080089003.0.
(Continued)

*Primary Examiner* — Adil A. Siddiqui
(74) *Attorney, Agent, or Firm* — Morgan Lewis & Bockius LLP

(57) ABSTRACT

According to an exemplary embodiment of the present invention, a method for manufacturing a grain-oriented electrical steel sheet includes: a step of hot-rolling a slab to manufacture a hot-rolled steel sheet; a step of performing hot-rolled sheet annealing on the hot-rolled steel sheet; a step of performing primary cold-rolling on the hot-rolled sheet annealed hot-rolled steel sheet; a step of performing primary decarburization annealing on the primarily cold-rolled steel sheet; a step of performing secondary cold-rolling on the decarburization-annealed steel sheet; a step of performing secondary decarburization annealing on the secondarily cold-rolled steel sheet; and a step of performing continuous annealing on the secondarily decarburization-annealed steel sheet.

4 Claims, 1 Drawing Sheet

(51) Int. Cl.
*C21D 8/00* (2006.01)
*C21D 8/12* (2006.01)
*C22C 38/00* (2006.01)
*C22C 38/02* (2006.01)
*C22C 38/04* (2006.01)
*H01F 1/16* (2006.01)

(52) U.S. Cl.
CPC ......... *C21D 8/1233* (2013.01); *C21D 8/1255* (2013.01); *C21D 8/1261* (2013.01); *C22C 38/002* (2013.01); *C22C 38/02* (2013.01); *C22C 38/04* (2013.01); *H01F 1/16* (2013.01); *C21D 2201/05* (2013.01); *C22C 2202/02* (2013.01)

(58) Field of Classification Search
CPC ............... C21D 8/1255; C21D 8/1261; C21D 2201/05; C21D 1/74; C21D 8/1205; C21D 8/1266; C21D 8/1272; C21D 2211/001; C21D 2211/005; C22C 38/002; C22C 38/02; C22C 38/04; C22C 2202/02; C22C 38/004; H01F 1/16; Y02P 10/20

See application file for complete search history.

(56) References Cited

U.S. PATENT DOCUMENTS

| | | | | |
|---|---|---|---|---|
| 2016/0177413 | A1* | 6/2016 | Kwon | ..................... C22C 38/00 148/307 |
| 2017/0271061 | A1* | 9/2017 | Ko | ........................... C21D 3/04 |
| 2017/0314096 | A1 | 11/2017 | Thevenet | |

FOREIGN PATENT DOCUMENTS

| | | | |
|---|---|---|---|
| CN | 108699621 | A | 10/2018 |
| EP | 3225703 | A1 | 10/2017 |
| JP | H06-17129 | A | 1/1994 |
| JP | H06-306473 | A | 11/1994 |
| JP | H07-097631 | A | 4/1995 |
| JP | H10-317060 | A | 12/1998 |
| JP | 2000-26942 | A | 1/2000 |
| JP | 2011-26682 | A | 2/2011 |
| JP | 2011-208188 | A | 10/2011 |
| JP | 2013-32583 | A | 2/2013 |
| JP | 2018-502222 | A | 1/2018 |
| JP | 2019-119933 | A | 7/2019 |
| KR | 10-1996-0006026 | B1 | 5/1996 |
| KR | 10-0181947 | B1 | 4/1999 |
| KR | 10-0256342 | B1 | 5/2000 |
| KR | 10-2003-0013258 | A | 2/2003 |
| KR | 10-2014-0058942 | A | 5/2014 |
| KR | 104846177 | A | 8/2015 |
| KR | 10-2016-0063895 | A | 6/2016 |
| KR | 10-1657466 | B1 | 9/2016 |
| KR | 10-1657467 | B1 | 9/2016 |
| KR | 10-1675318 | B1 | 11/2016 |
| KR | 10-2017-0074635 | A | 6/2017 |
| KR | 10-1887605 | B1 | 8/2018 |
| KR | 10-2019-0077890 | A | 7/2019 |

OTHER PUBLICATIONS

Chinese Office Action dated Apr. 27, 2023 issued in Chinese Patent Application No. 202080089003.0.

Office Action issued Aug. 1, 2023 for corresponding Japanese Patent Application No. 2022-538348.

International Search Report dated May 10, 2021 issued in International Patent Application No. PCT/KR2020/018618 (with English translation).

Extended European Search Report dated Jan. 5, 2023 issued in European Patent Application No. 20902524.6.

* cited by examiner

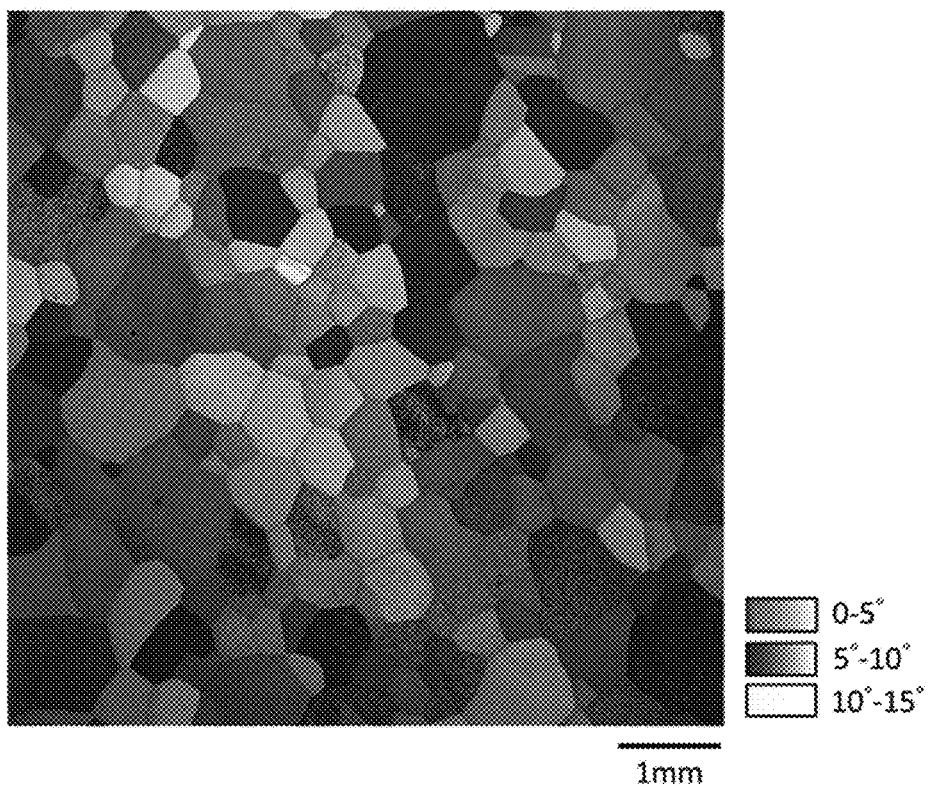

GRAIN-ORIENTED ELECTRICAL STEEL SHEET AND METHOD FOR MANUFACTURING SAME

CROSS-REFERENCE OF RELATED APPLICATIONS

This application is the U.S. National Phase under 35 U.S.C. § 371 of International Patent Application No. PCT/KR2020/018618, filed on Dec. 17, 2020, which in turn claims the benefit of Korean Application No. 10-2019-0171867, filed on Dec. 20, 2019, the entire disclosures of which applications are incorporated by reference herein.

TECHNICAL FIELD

The present invention relates to a grain-oriented electrical steel sheet and a method for manufacturing the same. Specifically, the present invention relates to a grain-oriented electrical steel sheet that has improved magnetic properties because it is manufactured through a plurality of cold-rolling and decarburization annealing processes, and a method for manufacturing the same.

BACKGROUND ART

A grain-oriented electrical steel sheet is a soft magnetic material that is composed of grains having a crystal orientation {110}<001>, which is a so-called Goss orientation, and has excellent magnetic properties in a rolling direction.

Such a grain-oriented electrical steel sheet is manufactured by heating a slab, rolling the slab to a final thickness through hot-rolling, hot-rolled sheet annealing, and cold-rolling, and then performing high-temperature annealing for primary recrystallization annealing and secondary recrystallization annealing.

In general, it can be said that a secondary recrystallization annealing process of the grain-oriented electrical steel sheet is a process that consumes a lot of energy because a low temperature increase rate and a long period of purification annealing at a high temperature are required. Since the grain-oriented electrical steel sheet having excellent magnetic properties is manufactured by forming secondary recrystallization through such an extreme process, the following difficulties occur in the process.

First, since a temperature deviation between an outer winding portion and an inner winding portion of a coil occurs due to heat treatment in a coil state, the same heat treatment pattern may be not applied to each portion, resulting in a magnetic deviation between the outer winding portion and the inner winding portion. Second, various surface defects occur in a process of coating MgO on the surface after decarburization annealing, and forming a base coating during high-temperature annealing, and thus, an actual yield is reduced. Third, since the decarburized sheet subjected to the decarburization annealing is subjected to coiling in a form of a coil, high-temperature annealing, flattening annealing again, and insulating coating, a production process is divided into three stages, and thus, an actual yield is reduced.

In order to overcome this process limitation, a technique using a normal grain growth without using a secondary recrystallization phenomenon by controlling decarburization annealing and a cold-rolling reduction ratio has been proposed. However, a large number of Goss-oriented grains with a crystal orientation that exactly coincides with {110}<001> may be not formed through continuous annealing due to a short heat treatment time of a few minutes, and there is a limit to reducing an iron loss.

DISCLOSURE

Technical Problem

The present invention has been made in an effort to provide a grain-oriented electrical steel sheet and a method for manufacturing the same. Specifically, the present invention has been made in an effort to provide a grain-oriented electrical steel sheet that has improved magnetic properties because it is manufactured through a plurality of cold-rolling and decarburization annealing processes, and a method for manufacturing the same.

Technical Solution

According to an exemplary embodiment of the present invention, a method for manufacturing a grain-oriented electrical steel sheet includes: a step of hot-rolling a slab to manufacture a hot-rolled steel sheet; a step of performing hot-rolled sheet annealing on the hot-rolled steel sheet; a step of performing primary cold-rolling on the hot-rolled sheet annealed hot-rolled steel sheet; a step of performing primary decarburization annealing on the primarily cold-rolled steel sheet; a step of performing secondary cold-rolling on the decarburization-annealed steel sheet; a step of performing secondary decarburization annealing on the secondarily cold-rolled steel sheet; and a step of performing continuous annealing on the secondarily decarburization-annealed steel sheet.

In a step of increasing a temperature after the step of performing secondary decarburization annealing on the secondarily cold-rolled steel sheet and before the step of performing continuous annealing on the secondarily decarburization-annealed steel sheet, the steel sheet may be heated at a rate of 10° C./sec or less in a temperature range of 950 to 1,000° C.

The slab may contain, by wt %, 1.0% to 4.0% of Si, 0.1% to 0.4% of C, and a balance of Fe and inevitable impurities.

The slab may further contain 0.1 wt % or less of Mn and 0.005 wt % or less of S.

In the step of performing hot-rolled sheet annealing on the hot-rolled steel sheet, a decarburization process may be included.

In the step of performing hot-rolled sheet annealing on the hot-rolled steel sheet, the annealing may be performed at a temperature of 850° C. to 1,000° C. and a dew point temperature of 70° C. or lower.

In the step of performing primary decarburization annealing on the primarily cold-rolled steel sheet, the annealing may be performed at a temperature of 850° C. to 1,000° C. and a dew point temperature of 50° C. to 70° C.

In the step of performing primary decarburization annealing on the primarily cold-rolled steel sheet, the annealing may be performed in an austenite single phase region or a region in which a composite phase of ferrite and austenite is present.

After the step of performing primary decarburization annealing on the primarily cold-rolled steel sheet, an average diameter of grains may be 150 to 250 µm.

The step of performing primary decarburization annealing on the primarily cold-rolled steel sheet and the step of performing secondary cold-rolling on the decarburization-annealed steel sheet may be performed two times or more.

In the step of performing secondary decarburization annealing on the secondarily cold-rolled steel sheet, the annealing may be performed at a temperature of 850° C. to 1,000° C. and a dew point temperature of 50° C. to 70° C.

In the step of performing secondary decarburization annealing on the secondarily cold-rolled steel sheet, the annealing may be performed for 30 seconds to 5 minutes.

In the step of performing continuous annealing on the secondarily decarburization-annealed steel sheet, the annealing may be performed at a temperature of 1,000° C. to 1,200° C. and a dew point temperature of −20° C. or lower.

In the step of performing continuous annealing on the secondarily decarburization-annealed steel sheet, the annealing may be performed for 30 seconds to 5 minutes.

The step of performing continuous annealing on the secondarily decarburization-annealed steel sheet may include a primary annealing step performed at 1,000° C. to 1,100° C. and a secondary annealing step performed at 1,130° C. to 1,200° C.

According to another exemplary embodiment of the present invention, there is provided a grain-oriented electrical steel sheet in which among all grains, grains having a ratio D2/D1 of a diameter D2 of an inscribed circle to a diameter D1 of a circumscribed circle of 0.4 or more are 90% or more, and grains in which a <100> crystal direction is parallel to a rolling direction (RD) of the steel sheet by 5° or less are 15% or more.

A fraction of grains having a grain diameter of 50 μm to 5,000 μm among all the grains may be 80% or more.

Grains in which a <100> direction forms an angle of 10 to 15° with the rolling direction (RD) of the steel sheet may be 30% or less.

The grain-oriented electrical steel sheet according to an exemplary embodiment of the present invention may contain, by wt %, 1.0% to 4.0% of Si, 0.005% or less (excluding 0%) of C, and a balance of Fe and inevitable impurities.

The grain-oriented electrical steel sheet according to an exemplary embodiment of the present invention may further contain 0.1 wt % or less of Mn and 0.005 wt % or less of S.

Advantageous Effects

As set forth above, in the grain-oriented electrical steel sheet according to an exemplary embodiment of the present invention, a large number of grains in which a <100> direction is parallel to a rolling direction (RD) of the steel sheet may be formed using a normal grain growth, and a fraction of grains having an excellent sharpness of 5° or less is high. Therefore, the grain-oriented electrical steel sheet has excellent magnetic properties.

Further, as a grain growth inhibitor, AlN and MnS are not used, and thus, there is no need to heat the slab to a high temperature of 1,300° C. or higher.

Further, there is no need to remove N and S, which are precipitates, and thus, a purification annealing time may be relatively shortened, and productivity may be improved.

Further, a grain-oriented electrical steel sheet having uniform magnetic properties in a width direction may be provided.

DESCRIPTION OF THE DRAWINGS

FIG. 1 is a photograph obtained by analyzing a surface of a grain-oriented electrical steel sheet manufactured using Inventive Material 10 with electron backscatter diffraction (EBSD).

MODE FOR INVENTION

The terms "first", "second", "third", and the like are used to describe various parts, components, regions, layers, and/or sections, but are not limited thereto. These terms are only used to differentiate a specific part, component, region, layer, or section from another part, component, region, layer, or section. Accordingly, a first part, component, region, layer, or section which will be described hereinafter may be referred to as a second part, component, region, layer, or section without departing from the scope of the present invention.

Terminologies used herein are to mention only a specific exemplary embodiment, and are not to limit the present invention. Singular forms used herein include plural forms as long as phrases do not clearly indicate an opposite meaning. The term "comprising" used in the present specification concretely indicates specific properties, regions, integers, steps, operations, elements, and/or components, and is not to exclude the presence or addition of other specific properties, regions, integers, steps, operations, elements, and/or components.

When any part is positioned "on" or "above" another part, it means that the part may be directly on or above the other part or another part may be interposed therebetween. In contrast, when any part is positioned "directly on" another part, it means that there is no part interposed therebetween.

Unless defined otherwise, all terms including technical terms and scientific terms used herein have the same meanings as understood by those skilled in the art to which the present invention pertains. Terms defined in a generally used dictionary are additionally interpreted as having the meaning matched to the related technical document and the currently disclosed contents and are not interpreted as ideal or very formal meanings unless otherwise defined.

In addition, unless otherwise stated, % means wt %, and 1 ppm is 0.0001 wt %.

In an exemplary embodiment of the present invention, the meaning of "further containing an additional element" means that the additional element is substituted for a balance of iron (Fe) by the amount of additional element added.

Hereinafter, exemplary embodiments of the present invention will be described in detail so that those skilled in the art to which the present invention pertains may easily practice the present invention. However, the present invention may be implemented in various different forms and is not limited to exemplary embodiments described herein.

According to an exemplary embodiment of the present invention, a method for manufacturing a grain-oriented electrical steel sheet includes: a step of hot-rolling a slab to manufacture a hot-rolled steel sheet; a step of performing hot-rolled sheet annealing on the hot-rolled steel sheet; a step of performing primary cold-rolling on the hot-rolled sheet annealed hot-rolled steel sheet; a step of performing primary decarburization annealing on the primarily cold-rolled steel sheet; a step of performing secondary cold-rolling on the decarburization-annealed steel sheet; a step of performing secondary decarburization annealing on the secondarily cold-rolled steel sheet; and a step of performing continuous annealing on the secondarily decarburization-annealed steel sheet.

Hereinafter, each step will be described in detail.

First, a slab is hot-rolled.

The slab may contain, by wt %, 1.0% to 4.0% of Si, 0.1% to 0.4% of C, and a balance of Fe and inevitable impurities.

The reason that the composition is limited is as follows.

Silicon (Si) reduces an iron loss by reducing magnetic anisotropy of the electrical steel sheet and increasing specific resistance. When a content of Si is less than 1.0 wt %, the iron loss is deteriorated, and when the content of Si exceeds 4.0 wt %, brittleness is increased. Therefore, the content of Si in the slab and in the electrical steel sheet after the final annealing step may be 1.0 to 4.0 wt %. More specifically, the content of Si may be 1.5 to 3.5 wt %.

Since a process in which carbon (C) in the central portion escapes into a surface is required so that Goss grains in the surface are diffused to the central portion during the intermediate decarburization annealing and final decarburization annealing, a content of C in the slab may be about 0.1 to 0.4 wt %. More specifically, the content of C in the slab may be 0.15 to 0.3 wt %. In addition, the amount of carbon in the grain-oriented electrical steel sheet finally manufactured after the continuous annealing step in which the decarburization is completed may be 0.0050 wt % or less. More specifically, the amount of carbon may be 0.002 wt % or less.

The slab may further contain 0.1 wt % or less of Mn and 0.005 wt % or less of S.

Mn and S form MnS precipitates, which inhibits growth of Goss grains diffusing to the central portion during the decarburization process. Therefore, it is preferable that Mn and S are not added. However, considering the inevitably mixed amount during a steelmaking process, it is possible to control Mn and S in the slab and the grain-oriented electrical steel sheet after the final annealing step to 0.1 wt % or less and 0.005 wt % or less, respectively.

The balance contains Fe and inevitable impurities. The inevitable impurities are impurities to be mixed in the steelmaking process and the manufacturing process of the grain-oriented electrical steel sheet and are well known in the art. Therefore, a specific description thereof will be omitted. Specifically, components such as Al, N, Ti, Mg, and Ca react with oxygen in the steel to form oxides, and thus are required to be strongly suppressed. Therefore, these components may be controlled to 0.005 wt % or less, respectively, if necessary. In an exemplary embodiment of the present invention, the addition of elements other than the above-described alloy components is not excluded, and various elements may be contained within a range in which the technical spirit of the present invention is not impaired. In a case where additional elements are further contained, these additional elements are contained by replacing the balance of Fe.

More specifically, the slab may contain, by wt %, 1.0% to 4.0% of Si, 0.1% to 0.4% of C, and a balance of Fe and inevitable impurities.

Before the slab is hot-rolled, the slab may be heated. A slab heating temperature may be 1,100° C. to 1,350° C., which is higher than a common heating temperature. In a case where the temperature is high when heating the slab, a hot-rolled structure is coarsened, which adversely affects magnetic properties. However, even when a slab reheating temperature is high, the hot-rolled structure is not coarsened due to a relatively high content of carbon in the slab, and the slab is reheated at a higher temperature than that in a common case, such that the method for manufacturing a grain-oriented electrical steel sheet according to an exemplary embodiment of the present invention is more advantageous in the hot-rolling.

In the hot-rolling, a hot-rolled sheet having a thickness of 1.5 to 4.0 mm may be manufactured by performing hot-rolling so that the hot-rolled sheet may be manufactured to a final product thickness by applying an appropriate rolling ratio in the final cold-rolling step.

A hot-rolling temperature or a cooling temperature is not particularly limited, and as an example for excellent magnetic properties, a hot-rolling end temperature may be set to 950° C. or lower, the hot-rolled sheet may be cooled by quenching with water, and the hot-rolled sheet may be coiled at 600° C. or lower.

Next, hot-rolled sheet annealing is performed on the hot-rolled steel sheet. In this case, the hot-rolled sheet annealing may include a decarburization process. Specifically, in the hot-rolled sheet annealing, the annealing may be performed at a temperature of 850° C. to 1,000° C. and a dew point temperature of 70° C. or lower. After the annealing described above, additional annealing may be performed at a temperature of 1,000 to 1,200° C. and a dew point temperature of 0° C. or lower. After the hot-rolled sheet annealing is performed, the annealed hot-rolled steel sheet may be pickled.

Next, primary cold-rolling is performed to manufacture a cold-rolled steel sheet.

In a common manufacturing process of a grain-oriented electrical steel sheet, it is known that it is effective to perform the cold-rolling once at a high reduction ratio close to 90%. This is because it creates an advantageous environment for grain growth of only Goss grains among primary recrystallized grains. However, in the method for manufacturing a grain-oriented electrical steel sheet according to an exemplary embodiment of the present invention, grains in which a <100> direction is parallel to a rolling direction (RD) of the steel sheet are diffused to the inside without using an abnormal grain growth of Goss-oriented grains, the grains being generated in the surface by the decarburization annealing and cold-rolling. Therefore, it is advantageous to form a large number of grains in which a <100> direction is parallel to the rolling direction (RD) of the steel sheet in the surface.

Accordingly, in a case where the cold-rolling is performed at a reduction ratio of 50% to 70% during the cold-rolling, a large number of Goss textures may be formed in the surface. Specifically, the reduction ratio may be 55% to 65%.

Next, primary decarburization annealing is performed on the cold-rolled steel sheet. In this case, the decarburization annealing step may be performed in an austenite single phase region or a region in which a composite phase of ferrite and austenite is present. Specifically, the annealing may be performed at a temperature of 850° C. to 1,000° C. and a dew point temperature of 50° C. to 70° C. In addition, an atmosphere may be a mixed gas atmosphere of hydrogen and nitrogen. In addition, a decarburization amount in the decarburization annealing may be 0.0300 wt % to 0.0600 wt %. After the annealing described above, additional annealing may be performed at a temperature of 1,000 to 1,200° C. and a dew point temperature of 0° C. or lower.

In such a primary decarburization annealing step, sizes of grains in the surface of the electrical steel sheet grow coarsely, but grains inside the electrical steel sheet remain as a fine structure. After such primary decarburization annealing, an average diameter of grains may be 150 μm to 250 μm. In this case, the grains are ferrite grains formed in the surface. In addition, the diameter of the grain refers to a diameter of a circle assuming an imaginary circle having the same area as the grain. A reference plane is a plane parallel to a rolled plane (ND plane).

Next, secondary cold-rolling is performed on the primarily decarburization-annealed steel sheet. Since the secondary cold-rolling is the same as the primary cold-rolling, a specific description thereof will be omitted.

The primary decarburization annealing step and the secondary cold-rolling step described above may be performed two times or more. These steps are performed two time or more, such that a large number of textures in which a <100> direction is parallel to the rolling direction (RD) of the steel sheet may be formed in the surface.

Next, secondary decarburization annealing is performed on the secondarily cold-rolled steel sheet.

In the secondary decarburization annealing step, the annealing may be performed at a temperature of 850° C. to 1,000° C. and a dew point temperature of 50° C. to 70° C. The decarburization annealing is performed on the cold-rolled sheet before the secondary annealing, and thus, a content of remaining carbon is 40% to 60% of the weight of the carbon in the slab. Therefore, in the secondary decarburization annealing step, as carbon escapes, the grains formed in the surface are diffused inside the steel sheet. In the secondary decarburization annealing step, the decarburization may be performed so that the amount of carbon in the steel sheet is 0.005 wt % or less.

In the secondary decarburization annealing step, the annealing may be performed for 30 seconds to 5 minutes. The decarburization may be sufficiently performed in the time range described above.

Next, continuous annealing is performed on the secondarily decarburization-annealed steel sheet.

In a step of increasing a temperature after the secondary decarburization annealing step and before the continuous annealing step, the steel sheet may be heated at a rate of 10° C./sec or less in a temperature range of 950 to 1,000° C. As such, a temperature increase rate is controlled to be low, such that there is an effect of increasing selectivity of an orientation in which the grain growth is easy in the grain growth process after the decarburization annealing is finished. The reason is that when a high temperature increase rate is applied, a sufficient time for selective growth by specificity of the crystal orientation of each grain may be not given due to a rapid supply of thermal energy, such that all grains with various orientations grow. According to the components and properties of the cold-rolled steel sheet of the present invention, the growth of grains in which a <100> direction is parallel to a rolling direction (RD) of the steel sheet is easy, and thus, an appropriate temperature increase rate for selective growth thereof is required. That is, among the grains in which a <100> direction is parallel to a rolling direction (RD) of the steel sheet, a large number of grains having a deviation of 5° or less may be formed. On the other hand, among the <100>//RD grains, a small number of grains in which a <100> direction forms an angle of 10 to 15° may be formed. More specifically, the steel sheet may be heated at a rate of 3 to 8° C./sec in a temperature range of 950 to 1,000° C.

In the continuous annealing step, the annealing may be performed at a temperature of 1,000° C. to 1,200° C. and a dew point temperature of −20° C. or lower. The purpose of the continuous annealing step is to decarburize the carbon in the steel and then grow the grains to a certain size or more. The reason is that a fraction of grains in which a <100> direction is parallel to the rolling direction (RD) of the steel sheet is continuously increased through the decarburization and the subsequent grain growth process.

In the continuous annealing step, the annealing may be performed for 30 seconds to 5 minutes.

Within the time range described above, growth of grains in which a <100> direction is parallel to the rolling direction (RD) of the steel sheet may be sufficiently performed.

The process from the primary cold-rolling up to the continuous annealing may be performed as a continuous process. The continuous process means that there is no batch process of coiling and annealing the steel sheet in a coil shape. As described above, the decarburization annealing step and the continuous annealing step are completed in a few minutes, the continuous process may be performed.

The continuous annealing step may include a primary annealing step performed at 1,000° C. to 1,100° C. and a secondary annealing step performed at 1,130° C. to 1,200° C. Each of the primary annealing step and the secondary annealing step may be performed for 30 seconds to 2 minutes.

As such, a two-stage soaking temperature is applied to the continuous annealing step, such that the average temperature increase rate is reduced. In particular, the soaking temperature in the primary annealing step is controlled to be relatively low, such that additionally selective growth of grains in which a <100> direction is parallel to the rolling direction (RD) of the steel sheet is provided at the time when the selective growth of the grains in which the <100> direction is parallel to the rolling direction (RD) of the steel sheet due to the decarburization annealing is completed. It is because that, as described above, when the temperature is rapidly increased, a sufficient time for selective growth by specificity of the crystal orientation of each grain is not given, whereas, when the temperature is relatively slowly increased, selective growth of grains in which a <100> direction is parallel to the rolling direction (RD) of the steel sheet due to specificity of the crystal orientation of the specimen after the decarburization annealing in this patent may be maximized.

In a finally manufactured grain-oriented electrical steel sheet subjected to the continuous annealing, among all grains, grains having a ratio D2/D1 of a diameter D2 of an inscribed circle to a diameter D1 of a circumscribed circle of 0.4 or more are 90% or more. This is because, as described above, the secondary decarburization annealing and the continuous annealing are performed in a short time. In a case where the annealing is performed through the batch annealing for 1 hour or longer as in the related art, the diameter D1 of the circumscribed circle is significantly larger than that of the diameter D2 of the inscribed circle, and thus, the ratio may be not greater than 0.4. Here, the circumscribed circle refers to the smallest circle among the virtual circles surrounding the outside of the grain, and the inscribed circle refers to the largest circle among the virtual circles included the inside of the grain. More specifically, among all the grains, grains having a ratio D2/D1 of a diameter D2 of an inscribed circle to a diameter D1 of a circumscribed circle of 0.4 or more may be 95% or more. Still more specifically, among all the grains, grains having a ratio D2/D1 of a diameter D2 of an inscribed circle to a diameter D1 of a circumscribed circle of 0.4 or more may be 95% to 99%.

In addition, in the finally manufactured grain-oriented electrical steel sheet, a large number of grains in which a <100> orientation is parallel to the rolling direction (RD) of the steel sheet by 5° or less may be formed, and a relatively small number of grains in which a <100> orientation forms an angle of 10 to 15° with the rolling direction (RD) of the steel sheet may be formed. Specifically, grains in which a <100> orientation is parallel to the rolling direction (RD) of the steel sheet by 5° or less are 15% or more. Grains in which a <100> orientation forms an angle of 10 to 15° with the rolling direction (RD) of the steel sheet may be 30% or less. As such, a large number of grains in which <100> orientations are accurately arranged are formed, which may contribute to improving magnetic properties. More specifically, grains in which a <100> orientation is parallel to the rolling direction (RD) of the steel sheet by 5° or less may be 15% to 30%. Grains in which a <100> orientation forms an angle of 10 to 15° with the rolling direction (RD) of the steel sheet may be 5% to 30% or less.

An area fraction of grains having a grain diameter of 50 μm to 5,000 μm among all the grains may be 80% or more. This is because, as described above, the secondary decarburization annealing and the continuous annealing are performed in a short time. As in the related art, in a case where the annealing is performed through the batch annealing for a long time of 1 hour or longer, the average grain diameter is increased by 5 mm or more, which is completely different from a grain size distribution of the grain-oriented electrical steel sheet according to an exemplary embodiment of the present invention. More specifically, a fraction of grains having a grain diameter of 50 μm to 5,000 μm among all the grains may be 90% or more. Still more specifically, a fraction of grains having a grain diameter of 50 μm to 5,000 μm among all the grains may be 90% to 99%.

In the grain-oriented electrical steel sheet according to an exemplary embodiment of the present invention, among all the grains, grains having a ratio D2/D1 of a diameter D2 of an inscribed circle to a diameter D1 of a circumscribed circle of 0.4 or more are 90% or more.

Grains in which a <100> orientation is parallel to the rolling direction (RD) of the steel sheet by 5° or less are 15% or more.

Grains in which a <100> orientation forms an angle of 10 to 15° with the rolling direction (RD) of the steel sheet may be 30% or less.

A fraction of grains having a grain diameter of 50 μm to 5,000 μm among all the grains may be 80% or more.

Since the orientation, shape, and diameter of the grain have been described in detail in relation to the method for manufacturing a grain-oriented electrical steel sheet, overlapping descriptions will be omitted.

The electrical steel sheet may contain, by wt %, 1.0% to 4.0% of Si, 0.005% or less (excluding 0%) of C, and a balance of Fe and inevitable impurities.

The electrical steel sheet may further contain 0.1 wt % or less of Mn and 0.005 wt % or less of S.

Since it is the same as the content of the component limitation of the slab except for C, an overlapping description will be omitted.

In the grain-oriented electrical steel sheet according to an exemplary embodiment of the present invention, a fraction of grains having an excellent sharpness of 5° or less is high, such that magnetic properties are excellent.

Specifically, an iron loss $W_{17/50}$ may be 1.55 W/kg or less. More specifically, the iron loss $W_{17/50}$ may be 1.00 to 1.50 W/kg. Still more specifically, the iron loss $W_{17/50}$ may be 1.10 to 1.50 W/kg. The iron loss $W_{17/50}$ is a size (W/kg) of the iron loss induced under conditions of 1.7 Tesla and 50 Hz.

In addition, a magnetic flux density $B_8$ may be 1.83 T or more. More specifically, the magnetic flux density $B_8$ may be 1.85 to 2.00 T. Still more specifically, the magnetic flux density $B_8$ may be 1.87 to 1.95 T.

The magnetic flux density $B_8$ is a magnetic flux density induced from a magnetic field of 800 A/m.

Hereinafter, specific Examples of the present invention will be described. However, each of the following Examples is merely a preferred Example of the present invention, and the present invention is not limited to the following Examples.

Example 1

A slab containing, by wt %, 2.0% of Si, 0.20% of C, and a balance of Fe and inevitable impurities was heated at a temperature of 1,250° C. and then hot-rolled, and hot-rolled sheet annealing was performed at an annealing temperature of 950° C. and a dew point temperature of 60° C. Thereafter, the steel sheet was cooled and then pickled, and the cooled and pickled steel sheet was cold-rolled at a reduction ratio of 50%, thereby manufacturing a cold-rolled sheet having a thickness of 1.4 mm.

The cold-rolled sheet was subjected to decarburization annealing (primary) again, and the decarburization-annealed cold-rolled sheet was subjected to pickling and cold-rolling at a reduction ratio of 54%, thereby manufacturing a 0.65 mm cold-rolled sheet. Thereafter, the cold-rolled sheet was subjected to decarburization annealing (secondary) at a temperature of 950° C. in a wet mixed gas atmosphere of hydrogen and nitrogen (a dew point temperature of 60° C.), and the decarburization-annealed cold-rolled sheet was cold-rolled again, thereby manufacturing a cold-rolled sheet having a thickness of 0.282 mm.

Thereafter, in the final annealing, decarburization annealing (tertiary) was performed at an atmosphere temperature of 950° C. and a wet mixed gas atmosphere of hydrogen and nitrogen (a dew point temperature of 60° C.) for 2 minutes. Thereafter, for grain growth annealing, heat treatment was performed while the cold-rolled sheet was retained at a primary soaking temperature summarized in Table 1 for 60 seconds and then was secondarily retained at 1,130° C. for 60 seconds. The temperature increase rate in a section of 950 to 1,000° C. and the fraction of grains in which a <100> direction was parallel to a rolling direction (RD) of the steel sheet were classified according to deviations of 0° to 5° and 10° to 15° through electron backscatter diffraction (EBSD) measurement. The results are summarized in Table 1.

In addition, the grains having a ratio D2/D1 of a diameter D2 of an inscribed circle to a diameter of D1 a circumscribed circle of 0.4 or more and the area fraction of grains having a grain diameter of 50 μm to 5,000 μm were analyzed by EBSD. The results are summarized in Table 1.

TABLE 1

| Primary soaking temperature (° C.) | Temperature increase rate in 950-1000° C. section (° C./sec) | <100>//RD (0°-5°) (%) | <100>//RD (10°-15°) (%) | Ratio D2/D1 of 0.4 or more (%) | Area fraction of 50 μm to 5000 μm grains (%) | $B_8$ (T) | $W_{17/50}$ (W/Kg) | Classification |
|---|---|---|---|---|---|---|---|---|
| 1150 | 15 | 9.9 | 33.3 | 95 | 96.2 | 1.78 | 1.45 | Comparative Material 1 |
| 1150 | 15 | 12.1 | 29.0 | 96 | 95.4 | 1.81 | 1.39 | Comparative Material 2 |
| 1100 | 10 | 14.1 | 32.5 | 97 | 96.2 | 1.82 | 1.38 | Comparative Material 3 |

TABLE 1-continued

| Primary soaking temperature (° C.) | Temperature increase rate in 950-1000° C. section (° C./sec) | <100>//RD (0°-5°) (%) | <100>//RD (10°-15°) (%) | Ratio D2/D1 of 0.4 or more (%) | Area fraction of 50 μm to 5000 μm grains (%) | $B_8$ (T) | $W_{17/50}$ (W/Kg) | Classification |
|---|---|---|---|---|---|---|---|---|
| 1100 | 10 | 13.3 | 24.1 | 98 | 91.1 | 1.80 | 1.35 | Comparative Material 4 |
| 1080 | 8 | 18.8 | 22.8 | 99 | 95.2 | 1.88 | 1.22 | Inventive Material 1 |
| 1080 | 8 | 15.9 | 28.4 | 97 | 96.5 | 1.88 | 1.21 | Inventive Material 2 |
| 1050 | 7 | 23 | 19.6 | 98 | 97.1 | 1.89 | 1.19 | Inventive Material 3 |
| 1050 | 7 | 19.6 | 23.4 | 99 | 96.1 | 1.87 | 1.15 | Inventive Material 4 |
| 1030 | 5 | 26.8 | 18.9 | 99 | 95.5 | 1.87 | 1.19 | Inventive Material 5 |
| 1030 | 5 | 30.4 | 20.6 | 95 | 93.5 | 1.90 | 1.18 | Inventive Material 6 |
| 1030 | 5 | 31.2 | 21.1 | 98 | 94.1 | 1.89 | 1.14 | Inventive Material 7 |
| 1030 | 5 | 35.2 | 9.9 | 97 | 99.1 | 1.89 | 1.13 | Inventive Material 8 |
| 1000 | 3 | 40.4 | 8.2 | 96 | 97.6 | 1.89 | 1.15 | Inventive Material 9 |
| 1000 | 3 | 40.8 | 9.2 | 99 | 96.8 | 1.90 | 1.10 | Inventive Material 10 |

As shown in Table 1, in the case where the temperature increase rate in a section of 950 to 1,000° C. was adjusted to 10° C./s or less during the final annealing process, a large number of grains having a deviation of 5° or less advantageous for magnetic properties in which a <100> orientation was parallel to the rolling direction (RD) of the steel sheet were formed.

FIG. 1 illustrates a photograph obtained by analyzing a surface of a grain-oriented electrical steel sheet manufactured using Inventive Material 10 with electron backscatter diffraction (EBSD). Grains in which a <100> direction was parallel to the rolling direction of the steel sheet were classified using each color at intervals of 5°.

Example 2

A slab containing, by wt %, 2.52% of Si, 0.195% of C, and a balance of Fe and inevitable impurities was heated at a temperature of 1,220° C. and then hot-rolled, and hot-rolled sheet annealing was performed at an annealing temperature of 950° C. and a dew point temperature of 60° C. Thereafter, the steel sheet was cooled and then pickled, and the cooled and pickled steel sheet was cold-rolled at a reduction ratio of 60%, thereby manufacturing a cold-rolled sheet having a thickness of 0.9 mm.

The cold-rolled sheet was subjected to decarburization annealing (primary) at a temperature of 950° C. in a wet mixed gas atmosphere of hydrogen and nitrogen (a dew point temperature of 60° C.), and the decarburization-annealed cold-rolled sheet was cold-rolled again, thereby manufacturing a cold-rolled sheet having a thickness of 0.35 mm.

Thereafter, decarburization annealing (secondary) was performed at an atmosphere temperature of 950° C. and a wet mixed gas atmosphere of hydrogen and nitrogen (a dew point temperature of 60° C.) for 150 seconds. Thereafter, for grain growth annealing, heat treatment was performed in the primary soaking temperature summarized in Table 2. The heat treatment was performed for 60 seconds during each retention, and the temperature increase rate in a section of 950 to 1,000° C. and the fraction of <100>//RD-oriented grains were measured according to deviations of 0° to 5° and 10° to 15° by EBSD measurement. The results are summarized in Table 2.

In addition, the grains having a ratio D2/D1 of a diameter D2 of an inscribed circle to a diameter D1 of a circumscribed circle of 0.4 or more and the area fraction of grains having a grain diameter of 50 μm to 5,000 μm were analyzed by EBSD. The results are summarized in Table 2.

TABLE 2

| Primary soaking temperature (° C.) | Temperature increase rate in 950-1000° C. section (° C./sec) | <100>//RD (0°-5°) (%) | <100>//RD (10°-15°) (%) | Ratio D2/D1 of 0.4 or more (%) | Area fraction of 50 μm to 5000 μm grains (%) | $B_8$ (T) | $W_{17/50}$ (W/Kg) | Classification |
|---|---|---|---|---|---|---|---|---|
| 1180 | 13 | 5.9 | 28.3 | 95 | 96.1 | 1.73 | 1.66 | Comparative Material 5 |
| 1180 | 13 | 7.1 | 28 | 96 | 96.6 | 1.76 | 1.58 | Comparative Material 6 |

TABLE 2-continued

| Primary soaking temperature (° C.) | Temperature increase rate in 950-1000° C. section (° C./sec) | <100>//RD (0°-5°) (%) | <100>//RD (10°-15°) (%) | Ratio D2/D1 of 0.4 or more (%) | Area fraction of 50 μm to 5000 μm grains (%) | $B_8$ (T) | $W_{17/50}$ (W/Kg) | Classification |
|---|---|---|---|---|---|---|---|---|
| 1130 | 10 | 9.3 | 34.5 | 95 | 95.6 | 1.78 | 1.75 | Comparative Material 7 |
| 1100 | 8 | 16.8 | 26.8 | 95 | 93.5 | 1.83 | 1.42 | Inventive Material 11 |
| 1100 | 8 | 16.9 | 25.6 | 99 | 94.9 | 1.85 | 1.41 | Inventive Material 12 |
| 1050 | 6 | 21.8 | 17.9 | 97 | 92.6 | 1.84 | 1.49 | Inventive Material 13 |
| 1050 | 6 | 17.9 | 25 | 98 | 94.6 | 1.84 | 1.45 | Inventive Material 14 |
| 1030 | 4 | 22.9 | 23.9 | 96 | 95.3 | 1.85 | 1.49 | Inventive Material 15 |
| 1030 | 4 | 28.9 | 28.5 | 96 | 94.4 | 1.87 | 1.48 | Inventive Material 16 |
| 1030 | 4 | 28.8 | 12.4 | 97 | 91.1 | 1.85 | 1.44 | Inventive Material 17 |
| 1030 | 4 | 27.9 | 6.9 | 98 | 98.6 | 1.86 | 1.43 | Inventive Material 18 |

As shown in Table 2, even during the continuous annealing process in which the contents of Si and C, the number of times of rolling, and the cold-rolled sheet thicknesses were different, when the heat treatment for grain growth was started, in the case where a low grain growth rate, that is, a temperature increase rate in a section of 950 to 1,000° C. was adjusted to 10° C./s or less in the initial stage of crystal growth, it could be confirmed that a crystal orientation advantageous for magnetic properties was formed.

The present invention is not limited to the exemplary embodiments and/or Examples, but may be manufactured in various different forms, and it will be apparent to those skilled in the art to which the present invention pertains that various modifications and alterations may be made without departing from the spirit or essential feature of the present invention. Therefore, it is to be understood that the exemplary embodiments and/or Examples described hereinabove are illustrative rather than being restrictive in all aspects.

The invention claimed is:

1. A grain-oriented electrical steel sheet in which among all grains, grains having a ratio D2/D1 of a diameter D2 of an inscribed circle to a diameter D1 of a circumscribed circle of 0.4 or more are 90% or more, and grains in which a <100> orientation is parallel to a rolling direction (RD) of the steel sheet by 5° or less are 15% or more, wherein grains in which a <100> direction forms an angle of 10° to 15° with the rolling direction (RD) of the steel sheet are 30% or less.

2. The grain-oriented electrical steel sheet of claim 1, wherein:
a fraction of grains having a grain diameter of 50 μm to 5,000 μm among all the grains is 80% or more.

3. The grain-oriented electrical steel sheet of claim 1, wherein:
the grain-oriented electrical steel sheet contains, by wt %, 1.0% to 4.0% of Si, 0.005% or less (excluding 0%) of C, and a balance of Fe and inevitable impurities.

4. The grain-oriented electrical steel sheet of claim 3, wherein:
the grain-oriented electrical steel sheet further contains 0.1 wt % or less of Mn and 0.005 wt % or less of S.

* * * * *